Dec. 11, 1962 P. W. BARR 3,067,852
FLOOR BIN HOPPER
Filed Nov. 4, 1960 4 Sheets-Sheet 4

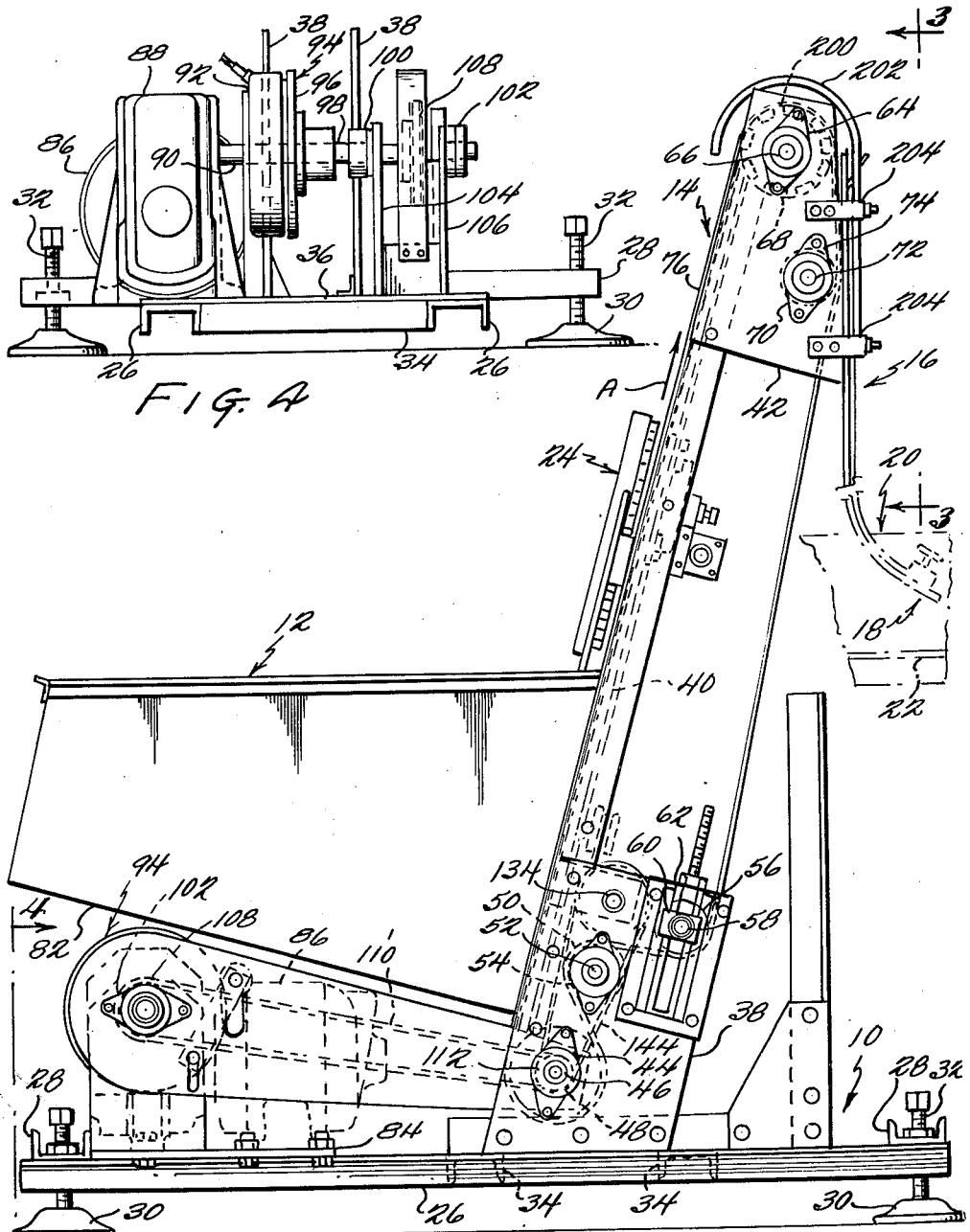

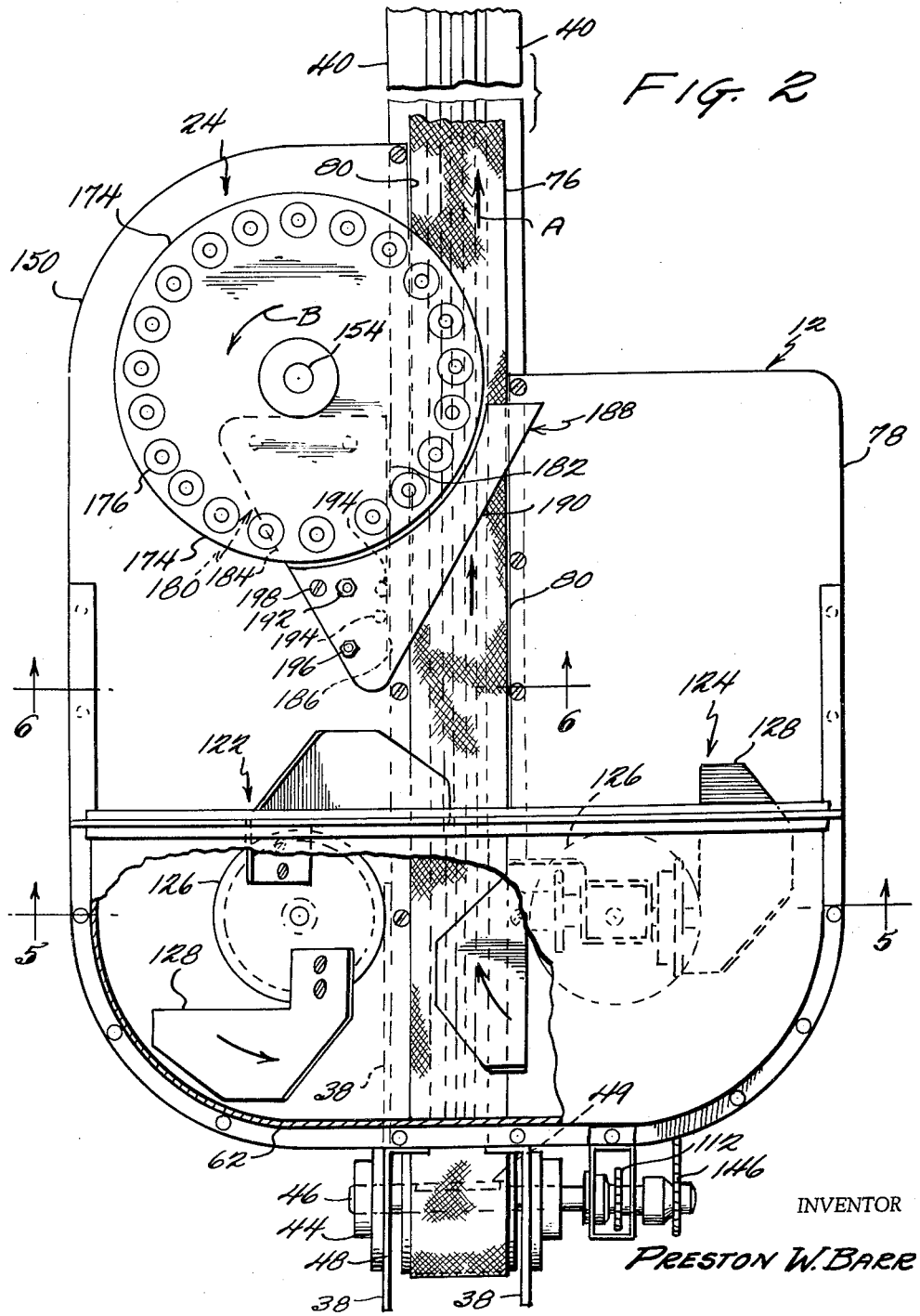

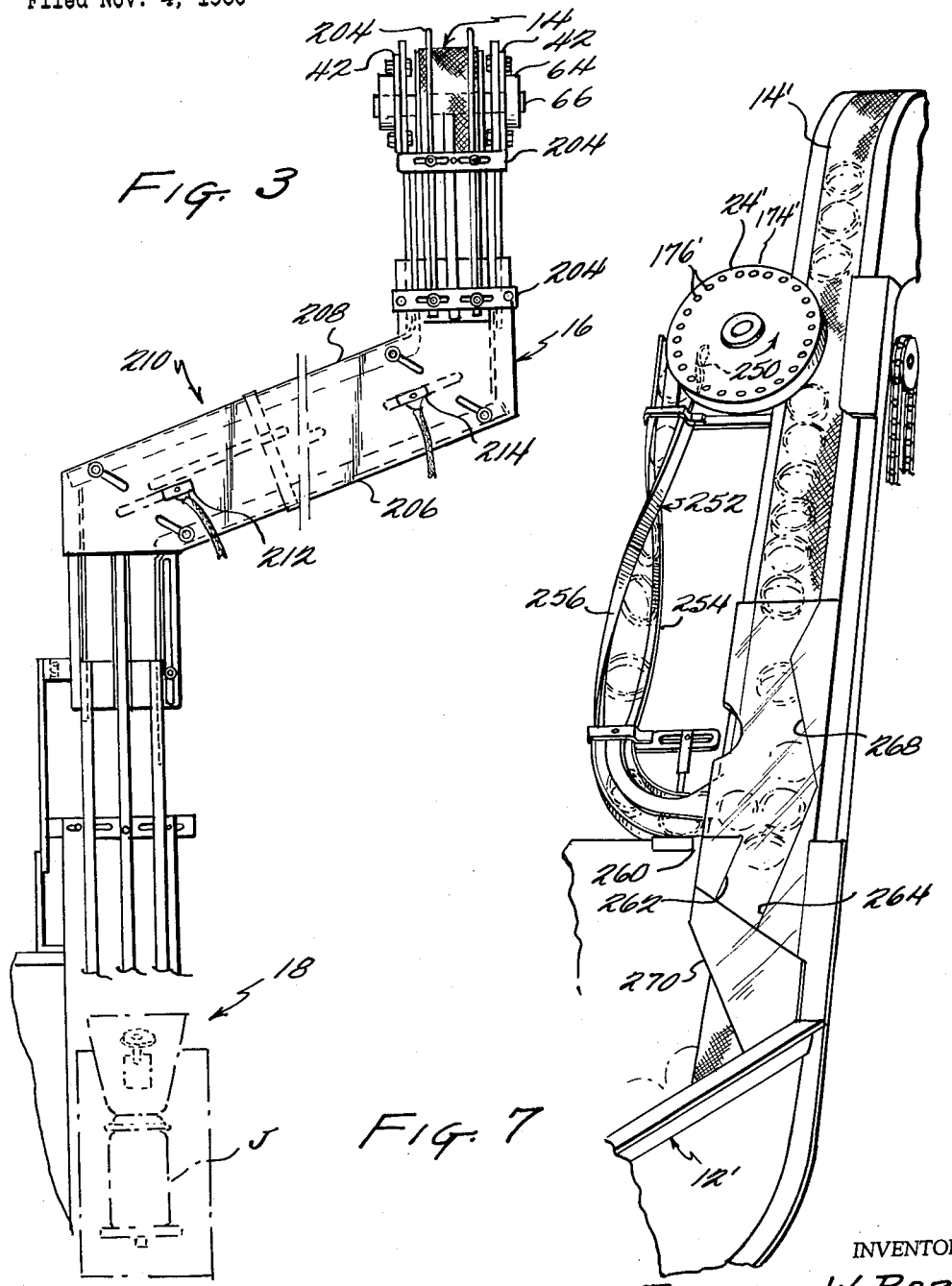

INVENTOR
PRESTON W. BARR

BY Cushman, Darby + Cushman
ATTORNEYS

3,067,852
FLOOR BIN HOPPER
Preston W. Barr, Baltimore, Md., assignor to Crown Cork & Seal Company, Inc., Philadelphia, Pa., a corporation of New York
Filed Nov. 4, 1960, Ser. No. 67,338
23 Claims. (Cl. 198—33)

The present invention relates to apparatus for feeding caps or the like in a predetermined oriented position to a point of use and, more particularly, to apparatus for feeding caps or the like from floor level to a suitable cap-applying and cap-securing mechanism.

A typical cap-applying and cap-securing apparatus is disclosed in United States Patent 2,734,672 issued February 14, 1956, to Carl E. Day and Frederick E. Fauth. In the aforementioned Day et al. patent, the apparatus disclosed is provided with a cap hopper of the type disclosed in Day et al. United States Patent No. 2,836,947 issued June 3, 1958, the hopper being mounted on the frame assembly above the cap-securing and cap-applying mechanism. Caps being fed from the hopper are oriented as they are fed so that they face the same way when conveyed to a cap chute having its discharge end connected to a cap-applying element. The apparatus of the present invention obviates the necessity of providing a cap hopper above the cap-applying mechanism and makes the cap hopper readily accessible to personnel at ground level.

While the present invention is primarily applicable to container sealing apparatus of the type described in the aforementioned patent, it is also capable of use with other apparatus for applying closures to containers as well as to apparatus used in the assembly of shells and liners to form the completed closures.

The term "cap," as hereinafter referred to throughout the specification and claims, is intended to cover any type of metallic closure or metallic shell for a closure having a skirt thereon. For example, the cap used with the apparatus of the present invention could be a screw cap, a lug cap, a side seal cap or a "crown" such as used in the bottling of carbonated and non-carbonated beverages. The description of the apparatus of the present invention is in connection with a container sealing machine of the type described in the aforementioned patent but, of course, this is merely illustrative of one type of machine which may be used with the present invention.

An object of the present invention is the provision of an apparatus which will feed caps properly faced at high speeds to a desired point of use of the caps.

Another object of the present invention is to provide an apparatus for feeding skirted caps in a properly oriented position to a point of use, the apparatus being so arranged as to have a cap hopper positioned at floor level whereby the supply of caps may be replenished without the stopping of the machine at the point of use. In an apparatus such as shown in the aforementioned Day et al. patent, the operator of the machine had to stop operation of the cap-applying mechanism when the supply of caps in the cap was low and it was desired to replenish the overhead hopper of the same.

Another object of the present invention is to provide an improved method of feeding caps in a properly oriented position to a point of use, which method involves gentle handling of the caps as they are properly oriented.

Still another object of the present invention is to provide an apparatus for feeding caps properly faced to a point of use, the apparatus including means to pick off caps improperly faced in such a manner that the caps are not scratched or marred while being removed from the line of feed. Heretofore, cap-feeding mechanisms for feeding caps properly faced have utilized mechanical means to brush off improperly positioned caps. Such mechanical means usually required a mechanical action which oftentimes resulted in scratching of the caps, and the present invention obviates such a disadvantage.

Still another object of the present invention is to provide an improved method and a cap-feeding means capable of feeding caps in a proper oriented position, the cap-feeding means being adaptable for use with any type of metallic cap. Prior apparatus required a special design of pick-off means for picking off improperly faced caps, the pick-off means being specially designed for the type of caps being picked off. In other words, a screw cap has a different type skirt than a crown or a lug cap, and consequently since mechanical pick-off means had to be designed for the specific configuration of the cap, the utility of the prior cap-feeding apparatus was limited to a particular type of cap.

Still another object of the present invention is to provide a cap-feeding means which is actuated upon demand for caps in the cap supply chute to the point of use. Such control of the cap-feeding means eliminates unnecessary agitation of the caps in the supply hopper as well as feeding of caps to the cap supply chute faster than the rate at which the caps are removed from the chute outlet. Consequently, such a control eliminates the danger of caps being forced from the outlet of the cap supply chute when there is no demand for caps at the point of use.

Another object of the present invention is to provide a cap-feeding mechanism capable of handling caps of different sizes by merely adjusting the cap supply chute.

A still further object of the invention is to provide a method and apparatus utilizing two magnetic fields for feeding caps in a properly faced position to a point of use.

These and other objects and advantages of the invention will be more apparent from the following specification, claims, and accompanying drawings in which:

FIGURE 1 is a side elevational view of the cap-feeding apparatus of the present invention, the view illustrating in broken lines a cap-applying and securing mechanism to which the cap-feeding apparatus is connected;

FIGURE 2 is an enlarged, fragmentary, front elevational view of the present invention and illustrating the cap hopper partly broken away and the cap pick-off mechanism;

FIGURE 3 is an enlarged, fragmentary, elevational view taken substantially on the line 3—3 of FIGURE 1 and illustrating the cap supply chute for feeding caps to a cap-applying and securing mechanism or the like;

FIGURE 4 is a fragmentary, elevational view taken on the line 4—4 of FIGURE 1 and illustrating the source of power, clutch, and a portion of the drive for the cap-feeding apparatus;

FIGURE 7 is a fragmentary, perspective view of a slightly modified form of apparatus of the present invention and illustrating a return for caps picked off to the conveyor in a properly oriented position.

Figure 5:
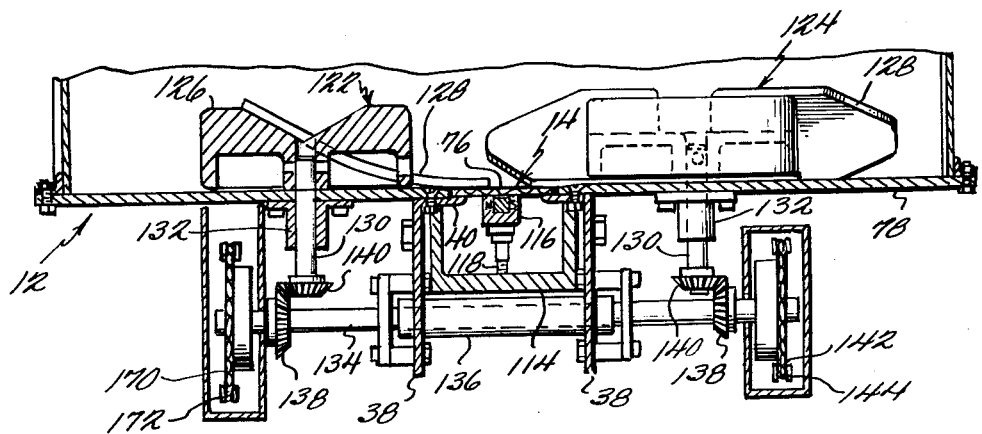
FIGURE 5 is a fragmentary, sectional view taken on the line 5—5 of FIGURE 2 and illustrating the specific drive to the agitators provided in the cap hopper.

Referring to the drawings wherein like character or reference numerals represent like or similar parts, and in particular, to FIGURE 1, the apparatus of the present invention for feeding caps or the like in a predetermined oriented position to a point of use includes a frame structure generally designated at 10, a cap hopper 12, an endless conveyor member 14 and a cap discharge chute 16 for delivering the caps to a cap-applying mechanism 18 shown in broken lines. The cap-applying mechanism 18 is of the type disclosed in the aforementioned Patent 2,734,672 and is carried on a container sealing apparatus, a fragment of which is schematically presented in broken lines at 20. Containers traveling on a conveyor 22 through the container sealing apparatus 20 are adapted to pick the caps off the container applying mechanism 18, one at a time, and then the caps are secured to the container by securing mechanism (not shown).

The caps which are dumped into the hopper 12 are picked up at random by the endless conveyor member 14 and moved in a generally inclined vertical direction by the conveyor member toward the discharge chute 16. The caps, which are either faced downwardly or upwardly on the endless conveyor member 14, pass a pick-off station, generally designated by the numeral 24, which picks off those caps having their skirts faced downwardly, and returns the same to the supply of caps in the hopper where they may be picked up again by the endless conveyor member 14. The caps which pass the pick-up station in the proper oriented position, that is, with their skirts facing upwardly, are transferred by the endless conveyor member 14 to the downwardly directed cap discharge chute 16, where they fall by gravity to the cap-applying mechanism 18. The cap-applying mechanism retains the caps in the chute 16 until such time that a container passing beneath the cap-applying mechanism picks one cap from the line of caps therein. The supply of caps to the discharge chute 16 by the endless conveyor member 14 is controlled by the presence of caps in the discharge chute. In other words, if the discharge chute 16 is filled with caps and there is no demand for caps at the cap-applying mechanism, the conveyor member 14 is stopped and will not deliver furthers caps to the chute so as to force caps from the end of the cap-applying mechanism 18. A more detailed description of the control means will follow later in the specification.

Frame structure 10 includes a pair of spaced horizontal base frame members 26 which are channel-shaped in cross-section and which support a pair of channel-shaped end cross-frame members 28. Pedestals 30, each having a threaded standard 32, are threadedly received in the cross-members 28 and provide means for leveling the frame structure 10 when the apparatus is connected to cap-sealing machine 20.

Carried between the spaced, horizontal frame members 26 intermediate the end-cross members 28 are a pair of channel-shaped, cross-members 34 which are adapted to support a base plate member 36 (FIGURE 4). The horizontally disposed base plate member 36 fixedly supports a pair of spaced, upwardly extending flange members 38 which carry a pair of upwardly extending L-shaped conveyor rail members 40. Rail members 40 support at their upper ends a pair of spaced plate members 42.

As best shown in FIGURE 1, the plate members 38 are provided with aligned bearings 44 which support a horizontally disposed shaft 46. The shaft 46 has keyed thereto, as indicated at 49 (FIGURE 2) a roller member 48 about which the lower end of the endless conveyor member 14 passes. Plate members 38 also support aligned bearings 50 carrying a shaft 52 for rotatably supporting an idler roller 54. A second idler roller 56 carried on a shaft 58 is adjustably supported in the adjustable bearings 60 slidably mounted on bearing supports 62 carried by the plates 38.

The upper plate members 42 each carry a bearing 64 which supports a shaft 66 on which is mounted a roller member 68. Each plate 42 carries an additional bearing member 70 which supports a shaft 72 carrying an idler roller 74. It is now apparent, the endless conveyor member 14, which is a belt type of conveyor, passes about the lower roller 48, the upper roller 68 and idler rollers 74, 50 and 56. The upwardly extending run of endless conveyor belt member 14 is supported on the rail members 40, as best shown in FIGURES 1 and 2. This run, which is designated as 76, cooperates with the hopper 12 to pick caps at random therefrom and transfer them upwardly to a point where they are received in the cap-receiving chute 16. By mounting the idler roller 56 in a manner where its position may be adjusted, suitable tension may be applied to the belt of conveyor member 14.

Referring to FIGURE 2, it will be noted that cap supply hopper 12 is provided with a rear wall 78 that slopes at substantially the same angle as the run 76 of endless conveyor 14. The wall 78 of hopper 12 is provided with a cut-out portion 80 and the lower portion of the upwardly extending run 76 fits into the cut-out portion 80 and defines a portion of the wall 78. The cap supply hopper 12 is provided with a bottom wall 82 which slopes downwardly toward the wall 78 of the hopper so that caps tend to move by gravity toward the wall 78. Hopper 12 is fixedly connected to the frame structure 10 and to the lower portion of upwardly extending conveyor rails 40 in any suitable manner.

A plate member 84 carried by the horizontal frame members 26 is adapted to support an electric motor 86. Also supported on the plate member 84 is a gear reduction unit 88 coupled to the motor 86 and having an output shaft 90 coupled to a drive member 92 of an electromagnetic clutch 94. The electromagnetic clutch 94 is provided with a driven member 96 keyed to a driven shaft 98 suitably supported in the bearings 100 and 102 supported in upwardly extending flange members 104 and 106. A gear 108 keyed to the driven shaft 98 is adapted to receive a chain drive 110, the chain drive also passing around a gear 112 keyed to the outer end of shaft 46. Electric motor 86 is adapted to be constantly driven so that the drive shaft 90 is continuously rotating. However, the conveyor belt member 14 is not driven until the electromagnetic clutch 94 is energized so that the drive member 92 engages the driven member 96. Energization of electromagnetic clutch 94 will result in the driven shaft 98 being rotated to thus cause rotation of the gear 108 and the chain drive 110 to thereby rotate the gear 112 keyed to the shaft 46 carrying the lowermost roller 48. Rotation of the roller 48 will cause the endless conveyor belt member 14 to move with the run 76 moving upwardly in the direction of the arrow A in FIGURES 1 and 2.

Figure 6:
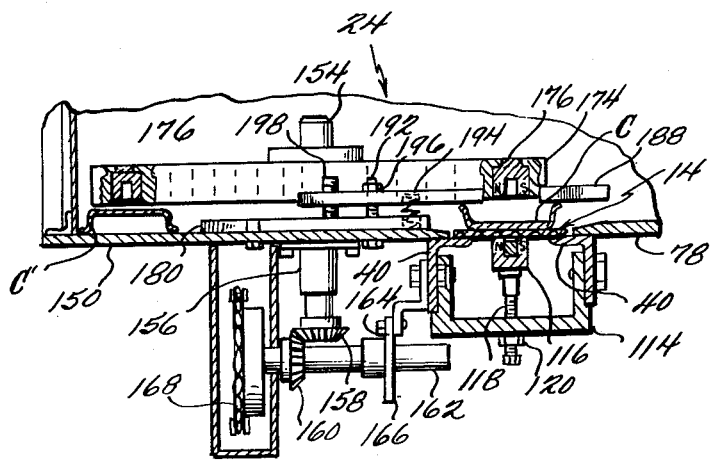
FIGURE 6 is an enlarged, fragmentary, sectional view taken substantially on the line 6—6 of FIGURE 2 and illustrating the pick-off mechanism for picking off improperly faced caps from the conveyor.

Referring now to FIGURES 1, 5 and 6, a plurality of bracket members 114 are fixedly connected to the rails 40 at spaced points vertically thereof. The brackets 114 support a plurality of bar magnets 116 immediately beneath and on the longitudinal axis of the upwardly extending run 76 of conveyor member 14. The bar magnets 116 which are U-shaped in cross-section extend in alignment with each other for the entire length of the run 76 of conveyor member 14 between the lower roller 48 and the upper roller 68, the bar magnets creating a magnetic field along the entire upward run 76 of the endless conveyor belt member 14 so that caps in the hopper will be picked up at random and held on the outer surface of the run 76 and transferred upwardly in the direction of the arrow A. Each of the bar magnets 116 is carried on a screw member 118 which is threadedly received in the brackets 114, as indicated at 120 in FIGURE 6. Thus, the bar magnets 116, which are U-shaped in cross-section, may be adjusted toward and away from the lower surface of the upwardly extending run 76 of conveyor belt member 14 to thereby vary the strength of the magnetic field which causes caps to adhere to the conveyor belt 14.

Referring now to FIGURES 2 and 5, a pair of agitator members 122 and 124 are provided within the hopper 12. The agitator members 122 and 124 are spaced on either side of the lower portion of run 76 of endless conveyor member 14 and are provided with a hub section 126 having a plurality of impeller blades 128 thereon. The hub section 126 and the impeller blades 128 are preferably made of a resilient but relatively rigid material so as not to mar the caps when they come in contact with the same in the hopper. As is evident from FIGURE 5, the impeller blades 128 are of such length that their tip portion passes just over the longitudinal axis of the run 76 of conveyor belt member 14. Also, the blades 128 of agitator 122 are out of phase with the blades 128 of agitator 124.

Each of the hubs 126 is mounted on a shaft 130, extending through the rear wall 78 of the hopper. Suitable bearings 132, carried on the rear wall 78 of hopper 12, rotatably support each of the shafts 130. A crossshaft 134, rotatably supported in a bearing sleeve 136, is provided with beveled gears 138 which are adapted to mesh with beveled gears 140 carried on the end of the shafts 130. The bearing sleeve 136 is supported between the flange member 38. At one end of shaft 134, a pinion gear 142 is provided, and it is adapted to receive a chain drive 144 which extends about a gear 146 keyed to the drive shaft 46. Thus, when the drive shaft 46 is rotated to operate the endless conveyor member 14, the gear 146 will cause the chain 144 to rotate the gear 142 and drive the agitators 122 and 124 in counter-rotation to one another. It is preferable that the agitators rotate in a direction counter to one another, as shown in FIGURE 2, with the agitator 124 rotating in a clockwise direction and the agitator 122 rotating in a counterclockwise direction. Such rotation of the agitators 122 and 124 will cause caps to be urged inwardly from both sides of the cap supply hopper 12 toward the lower end of run 76 of conveyor belt member 14, whereby the caps come under the influence of the magnetic field of magnets 116 and adhere to and are picked up by the conveyor belt member 14 and transferred upwardly therewith.

The pick-off station 24 is positioned intermediate the upper and lower ends of the upwardly moving run 76 of conveyor belt member 14. At pick-off station 24, any incorrectly positioned caps traveling on the upwardly extending run 76 of conveyor belt member 14 are wiped therefrom and returned to the cap supply hopper 12. In the particular enviornment of the present invention, the pick-off station 24 will wipe off those caps having their skirts facing downwardly on the run 76 of conveyor member 14, that is, those caps which have the main body portion of the cap facing outwardly of the conveyor member 14. In more detail, and referring specifically to FIGURES 2 and 6, the rear wall 78 of cap supply hopper 12 is provided with an upwardly extending portion 150 on one side thereof. A shaft 154 extending through the upwardly extending portion 150 is rotatably supported in a bearing 156 carried on the back side of the upwardly extending portion 150. The shaft 154 is provided at its lower end with a beveled gear 158. Beveled gear 158 meshes with a beveled gear 160 carried on a horizontally disposed shaft 162. The shaft 162, which is rotatably supported in a bearing 164 carried on a bracket 166, is provided at its outer end with a gear 168. The bracket 166 is suitably supported on one of the conveyor rails 40 of the frame structure 10. Gear 168 is in alignment with a gear 170 carried on the end of shaft 134 opposite the end carrying gear 142. A gear chain 172 extends around gear 168 and gear 170 and thus rotation of the shaft 134 will cause rotation of the gear 170 and through the chain 172 the gear 168 will rotate causing the shaft 162 and the shaft 154 to rotate.

A disc member 174 keyed to the end of the shaft 154 extending through the portion 150 of wall 78 is spaced from the outer face of the upwardly extending run 76 of conveyor 14 a distance slightly greater than the thickness of the caps being fed by the apparatus. The disc member 174 is provided adjacent its periphery with a plurality of circumferentially spaced, inwardly facing magnetic inserts 176 which create a second magnetic field having its flux opposing the flux of the magnetic field created by the permanent magnets 116. The magnetic inserts 176 are circumferentially spaced about the periphery of disc member 174 and travel with the disc member as it rotates. The inserts 176 travel on a line tangential to a plane extending through the longitudinal axis of the upwardly extending run 76 of conveyor belt member 14 so that when they pass over the conveyor belt 14 they are directly opposed to the magnets 116 supported beneath the conveyor belt in the immediate area. Also, it is preferable that the poles of the inserts 176 be opposed to the poles of the bar magnets 116 in the immediate location of the point of tangency so that the permanent magnetic inserts 176 and the permanent bar magnets 116 have opposed magnetic fields whereby the flux of one field repels the flux of the other field, thus there is not a tendency to weaken the magnets after continued use of the apparatus.

The disc member 174 rotates in the direction of the arrow B, as viewed in FIGURE 2. Caps held on the upwardly traveling run 76 of conveyor belt member 14 must pass beneath the disc at a point where the disc member 174 passes over the belt 14. At this point, the caps carried on the belt are subjected to two opposing magnetic fields, namely, the magnetic field of the run 76 and the magnetic field of the disc member 174. Since the magnetic fields oppose one another and are substantially the same strength, those caps having their body portion faced downwardly on the belt with their skirts extending upwardly are not affected by the magnetic inserts 176 of disc 174 because the magnetic attraction of the bar magnets 116 is such that it will hold the caps on the belt. These caps will pass upwardly past the pick-off station 24 as they are properly positioned on the conveyor member 14. As shown in FIGURE 6 on the right hand side thereof, a cap element C is illustrated passing beneath the disc 174, this cap C having its main body portion on the conveyor belt member 14 with its flanges facing upwardly. At will now be apparent, the magnetic force of the magnetic inserts 176 passing over the cap C are not sufficient to overcome the magnetic force of the magnets 116, as the magnets 116 are closer to the body portion of the cap. However, if the cap is positioned on the conveyor belt member 14 with its skirt facing downwardly and its body portion spaced from the conveyor member, then the body portion of the cap will be closer to the magnetic inserts 176 than it is to the bar magnets 116. The magnetic inserts 176 will then cause the cap to adhere to the disc, and as the disc rotates in the direction of the arrow B, such a cap will be removed from the line of caps passing upwardly on the run 76 of conveyor member 14. As illustrated on the left hand side of FIGURE 6, an improperly positioned cap C' is shown attracted to the magnetic insert 176, this cap having been previously wiped from the line of caps traveling on the conveyor belt member 14.

A triangularly-shaped plate member 180, having one edge 182 parallel with and adjacent to the edge of run 76, is bolted to the upwardly extending portion 150 of rear wall 78. The plate member 180 extends beneath the disc 174 and has an edge 184 extending at an angle thereto. The plate member 180 functions as a means for stripping the caps off the magnetic inserts 176 as the disc member 174 rotates in the direction of the arrow B. The skirts of the caps C' engage the edge 184 of the plate member 180 and are cammed off the magnets until they fall by gravity into the hopper 12. Plate member 180, which extends to a point 186 below the disc 174, also provides a means of adjustably supporting a second plate member 188 in spaced relationship thereto.

The plate member 188, which has an edge 190 extending completely across the run 76 at an angle thereto, is spaced from the run 76 a distance slightly greater than the thickness of a cap. The plate member 188 is supported by means of bolts 192, FIGURE 6, extending upwardly through the plate member 180 and through the plate member 188. Springs 194 interposed between the plate member 180 and 188 urge the plate member 188 upwardly against nuts 196 threaded onto the ends of bolts 192. A set screw 198 threaded through the plate 188 and bearing against the upper surface of the plate 180 is utilized for adjustably supporting the plate member 188 in a desired position above the belt member 14. The plate member 188 serves the function of preventing superimposed caps from the cap supply hopper 12 from moving upward with the belt member 14, as the edge 190 of the plate member will engage the uppermost cap of the superimposed caps and cam the same or both caps off back into the hopper. This prevents any jamming of caps at the area where the caps must pass beneath the disc member 174.

Referring now to FIGURES 1 and 3, it will be noted that the upper roller 68 over which the conveyor belt member 14 passes is provided with a plurality of radially spaced magnetic inserts 200 in its periphery. The purpose of providing the magnetic inserts 200 in the roller 68 is to pick up the cap at the end of the magnetic field created by the bar magnets 116 and urge the cap to continue to adhere to the conveyor belt until it travels around to a point received in and falls by gravity through the cap receiving chute 16. The bar magnets 116 terminate immediately adjacent the roller 68, and consequently it is necessary that the magnetic field causing the caps to adhere to the upwardly extending run 76 of belt member 14 be extended about the upper roller 68.

A pair of guide rails 202, supported by brackets 204, extend about the upper end of conveyor belt member 14 in spaced relationship thereto and provide a means for retaining the caps on the belt member as they are being conveyed around the roller 68. The bracket members 204 support the upper end of cap receiving chute 16 which extends downwardly therefrom to the cap-applying mechanism 18.

The chute 16, which is provided with the usual adjustable guide rails 206 and 208 for retaining the caps therebetween as they fall by gravity to the cap-applying mechanism 18, is provided with an offset portion generally indicated at 210. The offset portion 210 is provided with at least a pair of microswitches 212 and 214 arranged at each end thereof for determining the presence of caps in the offset portion of the chute. A third microswitch (not shown) may be provided adjacent the microswitch 214 and may be utilized in place of the microswitch 214 when it is desired to adjust the chute for different-sized caps. The microswitches 212 and 214, which are at different levels vertically, are normally closed when there is no cap engaging the same. The microswitches 212 and 214 are connected to a suitable clutch rectifier pack (not shown) and when there are caps filling the offset portion 210 of the chute 216, and consequently extending all the way to the cap-applying mechanism 18, both microswitches 212 and 214 are open. When both microswitches 212 and 214 are open, the electromagnetic clutch 94 is disengaged, thus stopping the conveyor belt 14, the agitators 122 and 124 in hopper 12 and the disc member 174 of pick-off station 24. This eliminates unnecessary agitation of the caps in the hopper and also the tendency of the endless conveyor belt member 14 to deliver caps to the cap-receiving chute 16 when, in fact, the cap-receiving chute cannot take more caps. When caps are stripped from the cap-applying mechanism 18 by containers J passing therebeneath, either the switch 212 or the switch 214 is closed, and when such switch is closed, it is an indication that there are no caps at that portion of the chute 16, and consequently the chute is available to accommodate more caps from the hopper. Closing either switch 212 or 214 by the lack of caps in the chute will cause the clutch 94 to be engaged, and thus the continuously operating motor 86 will drive the conveyor belt member 14, agitators 122 and 124, and the disc member 174 of the pick-off station 24. Caps will begin to flow upwardly on the run 76 of conveyor member 14 and be delivered to the cap-receiving chute 16, and until such time that the supply of caps fills the chute 16 to a point where both the microswitches 212 and 214 are open, the clutch will remain engaged.

Referring to FIGURE 7, a modified form of cap-feeding apparatus of the present invention is illustrated. In this form of the invention, the cap pick-off station 24' is provided with a rotating disc 174' having magnetic inserts 176' which oppose bar magnets (not shown) creating a magnetic field beneath the upper run of conveyor belt member 14'. The function of the pick-off station 24' is substantially identical with that heretofore described with respect to the pick-off station 24, but it will be noted that instead of discharging the caps from the disc back into the hopper, the caps are stripped from the disc 174' by a stripper plate 250 and are fed in an orderly manner into a chute 252 having guide rails 254 and 256 for supporting the caps. The guide rails are twisted 180° so that the caps traveling in the chute 252 are oriented 180°, and then they are discharged by the chute 252 back onto the conveyor member 14' in the proper position, that is, with their skirts facing upwardly.

As shown in FIGURE 7, the discharge end of chute 252 is generally indicated at 260 and is positioned above the hopper 12'. A throat member, comprising a plurality of plate members 262 and 264, define a passageway and stripper means so that only one cap at a time can pass upwardly along the conveyor belt member 14' from the hopper 12'. The caps being discharged above the plate members 262 and 264 are directed between the caps passing upwardly through the throat defined by the plate members 262 and 264 and a further plate member 268 is adapted to arrange the caps so that they can only pass in single file upwardly on the conveyor belt 14'.

A stripper plate 270, extending across the conveyor belt member 14' at a height spaced therefrom slightly greater than the thickness of the caps, provides a means for stripping superimposed caps off of the belt member 14' prior to the caps entering the throat defined by the plates 262 and 264.

It is thus seen that the objects and advantages of this invention have been fully and effectively accomplished by the described method and by the described apparatus illustrated in the drawings. However, the foregoing specific embodiments of the apparatus are subject to some changes without departing from the principles of the invention involved. For this reason, the terminology in the specification is for the purpose of description and not limitation, the scope of the invention being defined in the claims.

What is claimed is:

1. In an apparatus for feeding skirted caps to a cap applying machine or the like: a cap hopper; an endless conveyor having at least one run cooperating with and extending upwardly from said hopper; magnetic means cooperating with the run extending upwardly from the hopper for causing caps to be picked from said hopper and retained on said run; a cap receiving chute cooperating with the upper end of said run and extending downwardly therefrom to the cap applying machine; and a second magnetic means positioned outwardly of the surface of said run intermediate its ends for picking off caps improperly positioned on said run.

2. A cap feeding apparatus of the character described in claim 1 wherein said second magnetic means includes a rotatable disc having a plurality of magnetic inserts circumferentially spaced about the periphery thereof, said disc being spaced from the run of said endless conveyor a sufficient distance to permit the caps to pass between the disc and the run of the endless conveyor.

3. A cap feeding apparatus of the character described in claim 2, including means for stripping caps from said disc and returning the caps directly to said hopper.

4. A cap feeding apparatus of the character described in claim 2, including means for stripping the caps from said disc, and means for receiving strip caps and orienting the caps while transferring them back to the run of said conveyor at a point above said hopper.

5. A cap feeding apparatus of the character described in claim 4 wherein said last-mentioned means includes a chute cooperating with said stripping means for receiving caps, said chute including a pair of guide members for orienting the caps and discharging the same in proper position on the upward run of said endless conveyor.

6. In an apparatus for feeding skirted caps to a cap applying machine or the like: a cap hopper; an elongated upwardly extending frame structure; at least one roller supported in the lower portion of said frame structure and one roller supported in the upper end of said frame structure; an endless conveyor belt passing about said rollers and having an upwardly extending run cooperating at its lower end with the interior of said cap hopper; magnetic means supported by said frame structure beneath the upwardly extending run of said endless conveyor belt whereby caps in said hopper are picked therefrom and retained on the upwardly extending run of said conveyor belt; a cap receiving chute cooperating with the upper end of the upwardly extending run of said conveyor belt for receiving caps therefrom and transferring them downwardly to the cap applying machine; a rotating disc operatively supported by said frame structure and rotatable in a plane parallel to and spaced from the cap receiving surface of the upwardly extending run of said conveyor belt; magnetic means on said disc opposing said first-mentioned magnetic means for picking caps off of the upwardly extending run when caps are improperly positioned thereon; and stripper means including a plate element cooperating with said disc to strip caps therefrom.

7. A cap feeding apparatus of the character described in claim 6 wherein said upper roller includes a plurality of magnetic inserts which causes caps to adhere to said belt when passing about the same until caps are received by said cap receiving chute.

8. A cap feeding apparatus of the character described in claim 6, including a chute for receiving caps stripped from said disc, said chute being arranged to orient the caps and properly discharge the caps onto the run of said conveyor belt above said hopper.

9. An apparatus for feeding skirted caps in an oriented position to a place of use, comprising a cap hopper, a cap conveyor having a portion movable through said hopper, magnetic means cooperating with said conveyor for causing caps to be picked up by and adhered to said conveyor as the caps are transferred from the hopper to the place of use in a substantially straight line; means for picking off caps improperly positioned on said conveyor, said last-mentioned means including a second magnetic means having a magnetic flux opposing magnetic flux of said first magnetic means at a point along said conveyor whereby caps having their skirts extending downwardly on said conveyor adhere to said pick-off means.

10. An apparatus of the character described in claim 9 wherein said pick-off means includes a rotatable substantially planar disc and said second magnetic means include magnetic inserts circumferentially spaced about the planar face of said disc, said disc being adapted to rotate in a plane parallel to and spaced from said conveyor and said magnetic inserts being adapted to travel with said disc in a path tangential to a plane through the longitudinal axis of said conveyor.

11. An apparatus of the character described in claim 9 including means for receiving caps from said pick-off means and orienting and discharging the caps on the conveyor with the cap skirt extending upwardly.

12. An apparatus of the character described in claim 9 including means to strip caps from said pick-off means and return caps to said hopper.

13. In an apparatus for feeding skirted caps in an oriented position to a place of use: a cap hopper having side walls; an elongated upwardly extending frame structure, at least one roller supported in the lower portion of said frame structure and one roller supported in the upper end of said frame structure; an endless conveyor belt passing about said rollers and having an upwardly extending run, a lower portion of said run forming at least a portion of one of the side walls of said hopper; magnetic means supported by said frame structure beneath the upwardly extending run of said endless conveyor belt whereby caps in said hopper are picked therefrom and retained on the upwardly extending run of said conveyor belt; a cap receiving chute cooperating with the upper end of the upwardly extending run of said conveyor belt for receiving caps therefrom, said cap receiving chute extending in a downward direction whereby caps can move by gravity to a point of use; means cooperating with said run of said endless conveyor belt intermediate said hopper and the discharge end of the run for picking caps off said run which have their skirts extending downwardly on the run; a pair of rotatable agitators each having propeller blades, said agitators being mounted for rotation in said hopper on opposite sides of the portion of the run therein of said conveyor belt and arranged to rotate in counter rotation with each other in a direction to urge caps upwardly on said run; means to rotate said agitators and to drive said endless conveyor belt, said means including a source of power and clutch means; and means operatively connected to said clutch means for selectively operating the same, said last-mentioned means including means in said chute for determining presence of caps in said chute so as to disengage said clutch means.

14. An apparatus of the character described in claim 13 wherein said upper roller includes a plurality of magnetic inserts mounted in the periphery thereof, said magnetic inserts having a magnetic field in alignment with the magnetic field of said first magnetic means and being adapted to retain caps on said conveyor belt until caps are received in said cap receiving chute.

15. An apparatus of the character described in claim 13 wherein said pick-off means includes a substantially planar disc member rotatable in a plane parallel to and spaced from the plane of the upwardly extending run of said conveyor belt, said disc member being provided with a plurality of magnetic inserts circumferentially spaced about the same and arranged to pass over said conveyor belt with its magnetic flux opposing the magnetic flux of said first-mentioned magnetic means.

16. An apparatus of the character described in claim 15 icluding means to couple said disc to said drive means whereby rotation of said disc is controlled by engagement and disengagement of said clutch means.

17. An apparatus of the character described in claim 15 including means to strip caps traveling one on top of another from said belt prior to passing beneath said disc and to strip caps adhering to said disc, said means including a plate member extending over said belt at a distance greater than the height of a single cap but less than the height of two caps, said plate member having a portion thereof extending immediately beneath said rotating disc.

18. An apparatus of the character described in claim 15 including means to strip caps adhering to said disc and return caps directly to said hopper.

19. An apparatus of the character described in claim 15 including means to strip caps from said disc and transfer, orient and return said caps to the upward run of said belt in a proper, oriented position, said means including a chute for receiving caps stripped from said disc, said chute being twisted 180° and having its discharge end immediately adjacent the upward run of said endless conveyor belt.

20. A method of feeding skirted caps to a point of use in a predetermined oriented position comprising the steps of: picking up the caps at random from a source of supply and transferring the caps along a given line of travel while under the influence of magnetic flux from a magnetic field along the given line of travel, and then passing each of the caps while being transferred along the given line under the influence of the flux of the magnetic field through a second magnetic field having a magnetic flux opposing the magnetic flux of the first magnetic field, and then picking off caps arranged in one position and attracted more by magnetic flux of the second magnetic field than by magnetic flux of the first magnetic field from the given line of travel and transferring them along another separate given line of travel.

21. The method of claim 20 including the step of returning the caps picked from the given line to the source of supply.

22. The method of claim 20 including the step of transferring the caps picked from the given line in an orderly manner and orienting them 180° and returning them to the given line for transfer thereon.

23. The method of claim 20 including the step of transferring and orienting 180° caps picked from the given line and returning these caps to the given line at a point forward of the opposed fluxes of the magnetic fields.

References Cited in the file of this patent

UNITED STATES PATENTS

| | | |
|---|---|---|
| 1,773,646 | Skov | Aug. 19, 1930 |
| 2,252,498 | Flaws | Aug. 12, 1941 |
| 2,743,001 | Nordquist | Apr. 24, 1956 |